United States Patent [19]

Wagner et al.

[11] 4,290,290

[45] Sep. 22, 1981

[54] PROCESS FOR EXTRUDING A COMPOSITE SECTION, A DIE FOR THIS PURPOSE, AND THE RESULTANT COMPOSITE SECTION

[75] Inventors: Alfred Wagner, Steisslingen; Adolf Ames, Hilzingen-Duchtlingen, both of Fed. Rep. of Germany

[73] Assignee: Swiss Aluminium Ltd., Chippis, Switzerland

[21] Appl. No.: 92,934

[22] Filed: Nov. 9, 1979

Related U.S. Application Data

[63] Continuation of Ser. No. 887,317, Mar. 16, 1978.

[30] Foreign Application Priority Data

Mar. 22, 1977 [DE] Fed. Rep. of Germany ....... 2712366

[51] Int. Cl.$^3$ .......................... B21C 23/22; B29F 3/00
[52] U.S. Cl. ........................................ 72/256; 72/258; 72/270; 425/114
[58] Field of Search ................ 425/113, 114; 264/174; 72/253 R, 256, 268, 258, 260, 262, 270; 228/109, 175

[56] References Cited

U.S. PATENT DOCUMENTS

| 815,571 | 3/1906 | Williams | 425/114 |
|---|---|---|---|
| 1,197,326 | 9/1916 | Ackerman | 425/113 |
| 1,812,686 | 6/1931 | Crowdes | 264/174 X |
| 2,096,347 | 10/1937 | Short | 425/113 |
| 2,256,272 | 9/1941 | Batcheller | 228/175 |
| 2,696,640 | 12/1954 | Wienand | 425/114 X |
| 3,583,062 | 6/1971 | Sharp, Jr. et al. | 228/109 X |
| 3,956,056 | 5/1976 | Bogoslawski et al. | 425/115 X |
| 4,021,172 | 5/1977 | Prinz | 425/325 |
| 4,030,334 | 6/1977 | Wagner et al. | 425/114 |
| 4,167,866 | 9/1979 | Ames et al. | 72/258 |

FOREIGN PATENT DOCUMENTS 2208859 8/1973 Fed. Rep. of Germany ........ 72/258

Primary Examiner—Lowell A. Larson
Attorney, Agent, or Firm—Bachman and LaPointe

[57] ABSTRACT

A composite section comprises a beam-like section which may in particular be made of a light-weight metal, and a facing of at least a part of at least one face of the beam-like section made of another metal. The beam-like part is produced by extruding a billet of metal through a die, and at the same time the facing strip is fed through the shape-giving opening in the die. Inside the die there is provided at least one moving face which may e.g. be in the form of a wheel, over which the facing strip passes in being fed to the die opening. Also the strip can be deformed during feeding or extrusion to provide a variety of shapes. The wheels can be shaped to effect the shaping of the strip. They also reduce friction and wear in the die. Measures are taken to allow easy access to such wheels for ease of repair or for changing the wheels.

7 Claims, 9 Drawing Figures

PROCESS FOR EXTRUDING A COMPOSITE SECTION, A DIE FOR THIS PURPOSE, AND THE RESULTANT COMPOSITE SECTION

This is a continuation of application Ser. No. 887,317, filed Mar. 16, 1978.

BACKGROUND OF THE INVENTION

The invention concerns a process for extruding a composite section comprising a beam-like section, in particular a beam-like section made of a light-weight metal, and a facing of at least a part of at least one of the surfaces of the beam-like section in the form of a strip of a different metal, in which process the beam-like section is formed by forcing a billet through a die and, at the same time, the metal strip passes through the shape giving section of the die. Furthermore, the invention concerns a die for carrying out this kind of extrusion and concerns a composite section so produced.

In such a process use is made of an extrusion die with feed channels at the side through which the metal facing strip is fed to the so called shape-giving or die opening and thereby deflected into the direction of extrusion. In practice however the extrusion dies which have been known up to now for this purpose are usually troublesome in production due either to the strip sticking in the die or due to wear caused by the die. Furthermore, the choice of section shape is often limited to those which are flat on at least a part of the surface.

SUMMARY OF THE INVENTION

With this in mind, the inventor set himself the task of developing a process and extrusion die of the kind described at the beginning, with the help of which a very wide range of shapes can be manufactured in a simple manner which can be readily carried out in production. Also, because of the shapes of section possible, the field of application of composite sections should be extended.

This object is fulfilled by way of the process of the invention in that the facing strip is led on a moving surface to the die opening. In the process of the said facing strip coming in contact with the moving surface the strip should, if necessary, be deformed.

The facing strip is fed to the matrix by means of a negligibly small amount of friction in contact with the moving surface in the extrusion die, and thus deflected into the direction of extrusion.

In addition, the cross section of the strip is deformed while in contact with the moving surface—even during the extrusion process, at the die opening itself; the moving surface is designed with the desired shape of composite section in mind and, while being transported on the moving surface, the strip takes on the shape prescribed by the moving surface, at the latest when under the influence of the force of extrusion.

A plurality of strips can therefore be shaped simultaneously to cross sectional shapes which, if desired, may differ from one another, and then fed to the die opening which allows the production of composite sections which have at least three component layers, and this in a suprisingly simple manner.

The present invention also resides in an extrusion die for the production of composite sections of the kind described at the beginning and having a feed channel at the side for inserting the facing strip into the die such that, at the end of the feed channel close to the die opening, at least one surface on which the facing strip lies during extrusion moves towards the die opening. Also, there can be at least two such feed channels which lead to the die opening and which have moving surfaces in them to allow a plurality of facing strips to be fed into the die simultaneously, and where the moving surfaces are provided by wheels in the die; these wheels are fitted into the die in such a way that they can be changed in order to permit repairs to be done, or to allow other facing strip shapes to be produced.

During extrusion and on insertion of the facing strips, the matrix intercepts the outer, circumferential face of the wheel in such a manner that the facing strip and the face of the wheel are carried along together; as a result of the adjustment in relative movement between the strip and the matrix a metallic bond is promoted between both components of the section i.e. the structure of the two components becomes intimately engaged in each other.

To make it easier to fit or change wheels, the die can be divided into a die insert and a die holder, the channels for feeding-in the strips being formed out of grooves in the surface of the die insert and the surface of the die holder which the said grooves face; the recesses and thus the associated wheels are easily accessible when the die holder and die insert are separated.

It has been found in practice that the composite sections of the invention, because of the wide variety of shapes possible, are particularly suitable as elements for joining parts made of widely different materials; the facing strip, made of a heavy metal or a non-ferrous metal, can be joined thermally using a device suitable for this, and the lightweight metal beam section can be welded, for example to the superstructure of ships. The use of such extruded composite sections as connecting weld pieces simplifies, to a surprising degree, the assembly of constructions involving different metals. Therefore, extruded composite sections can now replace connecting pieces which have up to now always been made from composite sheets joined by explosive welding, and can do so at reduced costs.

BRIEF DESCRIPTION OF THE DRAWINGS

Exemplified embodiments of the invention will now be explained with the help of the following drawings viz., FIG. 1 End view of a die for the extrusion of composite sections.

DETAILED DESCRIPTION

A cylindrical die R for the extrusion of composite sections has a die insert 3 fitted-in to the ring-shaped collar 2 of a die holder 1.

Figure 1:
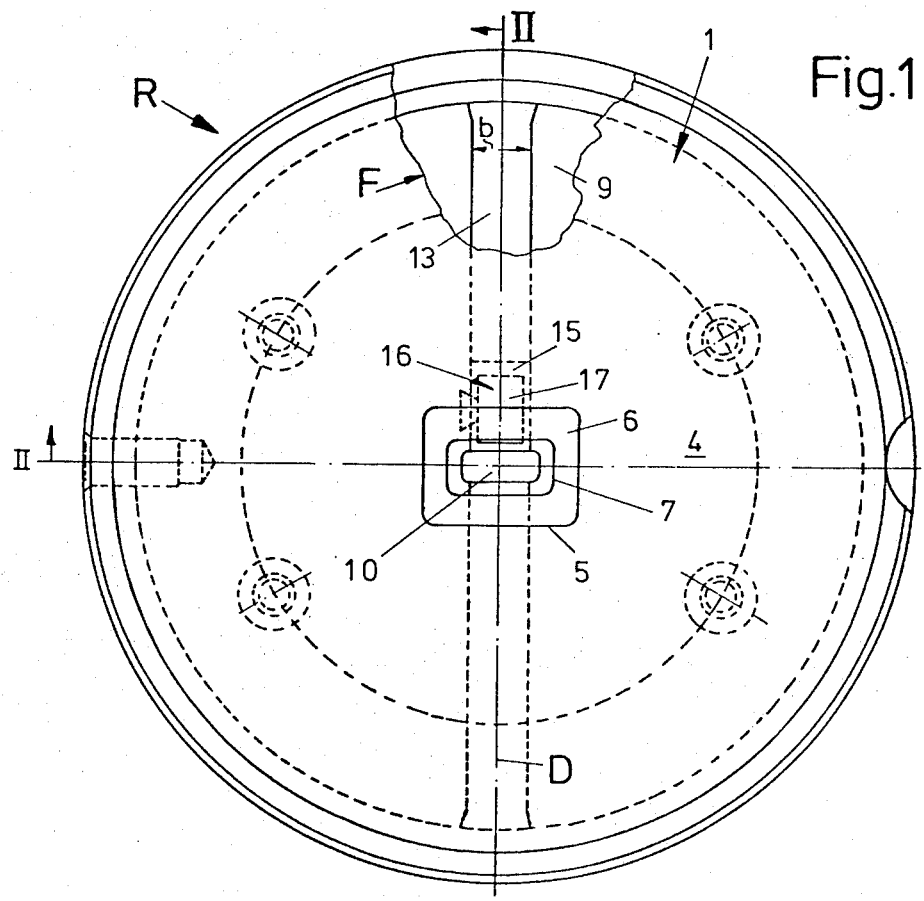

In the center of the entry side of face 4 of the die holder 1, highlighted in the exemplified embodiment shown in FIG. 1, a feed chamber 5 which is rectangular in cross section and tapers in the direction of extrusion x along the axis M of the die to form a sloping bearing surface 6. A rectangular feed chamber 7 also connects up with this surface 6. The face 8 of the die holder 1 next to the die insert 3 forms, inside the collar 2 of the die holder 1, a flat cone sloping in towards the die axis M and the chamber 7. A corresponding conical surface 9 of the die insert 3 lies against the face 8 of the die holder 1, and a die opening 10 of height h, which continues on from chamber 7, but is narrower than that chamber 7, is provided at the center. This opening 10 continues into a run-out channel 12 which is funnel shaped, opening out towards the face 11 of the die insert 3.

Two flat grooves 13 of breadth b (for example 20 mm) are provided along a common diameter D of the die (for example 300 mm) in the conical face 9 of the die insert 3. This can be seen in particular in the cut-away region F in FIG. 1. These grooves 13 form, together with the face 8 of the die holder 1, the channels 14 for feeding the facing strips B to the die opening 10 during the extrusion process.

Figure 2:
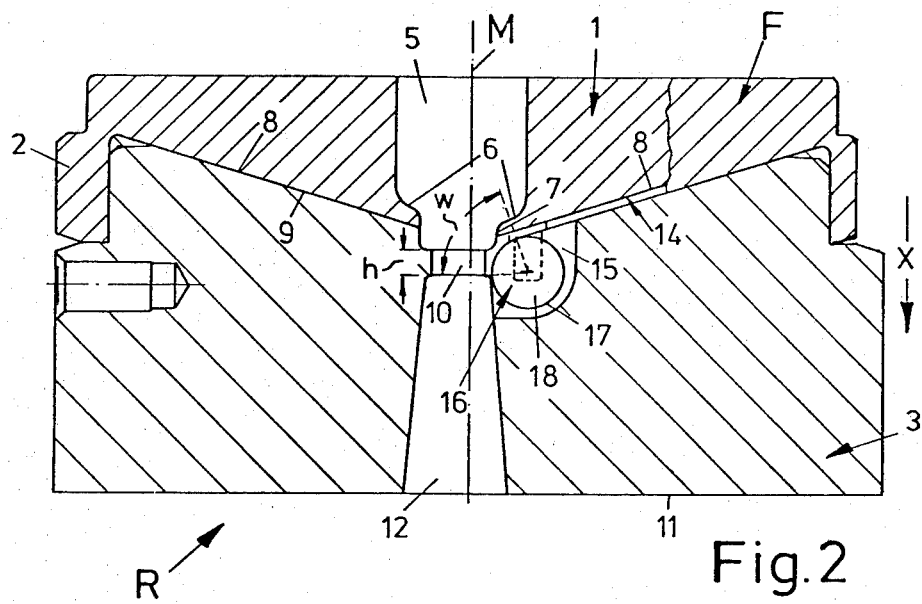
FIG. 2 Section along line II—II in FIG. 1.

Wheels 16 are provided in the recesses 15 at the points of transition between the channels 14 and the die opening 10. The strips B lie on the circumference faces 17 of these wheels 16 while passing through the die R in the region of the angle w (FIG. 2).

Figure 3:
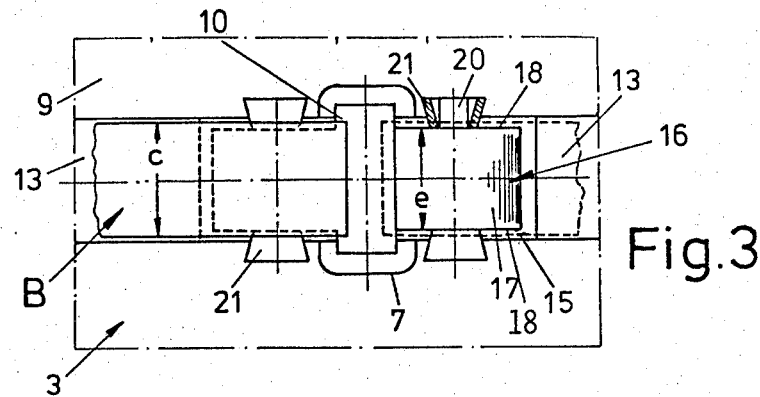
FIG. 3 End view showing an enlargement of part of the die in FIGS. 1,2.
Figure 4:
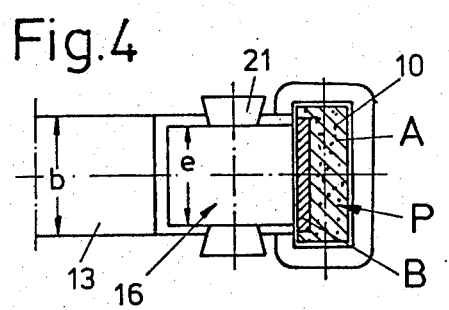
FIG. 4 Another version of the part shown in FIG. 3.

In the version shown in FIG. 3 with two wheels 16 flanking the die opening 10, and in the version shown in FIG. 4 with only one wheel 16, the breadth c of the strip B is greater than the length e in the direction parallel to the axis of the wheel 16, so that the strip B projects over both faces 18 of the wheel 16 and, in the region of the die opening 10, covers the recess 15 for the wheel 16.

At the composite section P formed in the die opening 10 of the die shown in FIG. 4, a light-weight metal matrix A engages the strip B of unplated steel at the sides—in FIG. 3 the matrix A is omitted to allow other details to be seen more clearly.

Figure 5:
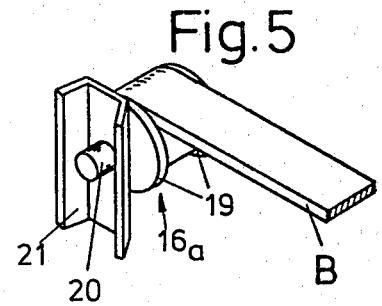
FIG. 5 A perspective view of a detail of another version of the extrusion die.

The wheel 16a in FIG. 5 is provided with flanges 19 at the side to guide the strip B over the wheel 16; these flanges 19 can, in a version of the die R not shown here, be broader than the strip B and can project into extensions at the side of the recesses 15—the length e of the wheels 16 is larger than the breadth b of the channels 13.

Plug-shaped bearings 20 project axially out from the flanges 19 and rotate in holes in bearing pieces 21 which are approximately U-shaped in cross section.

Figure 6:
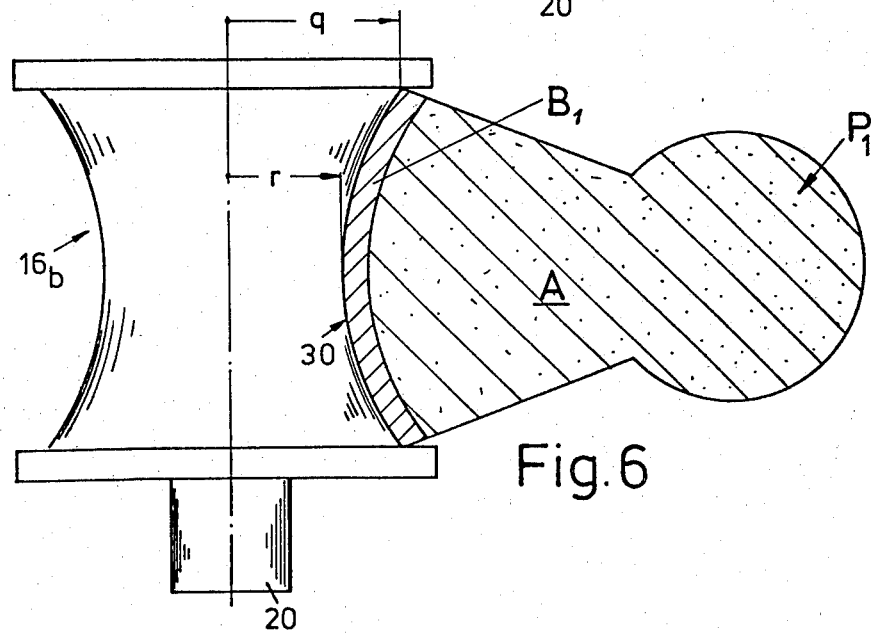
FIG. 6 A component part in the form of a wheel in a modified form and enlarged compared with FIGS. 3 to 5.

Flat strips B can be bent across their section to form curved strips $B_1$, before entering the die opening, or in the die opening itself, by means of wheels 16b (FIG. 6) the outer running face of which forms a surface, for example a single shell hyperboloid which can be described by a second order equation. The result is e.g. a composite section $P_1$, with a convex outer face 30.

Figure 7:
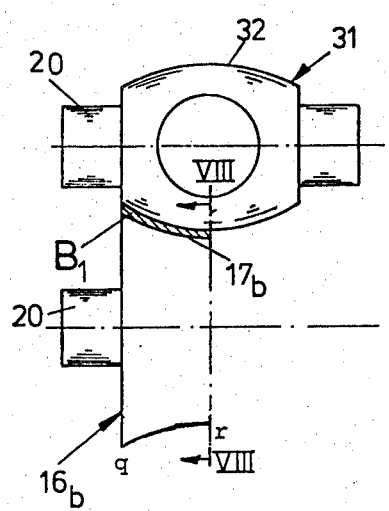
FIG. 7 A view of part of the wheel shown in FIG. 6, and a partnering wheel.
Figure 8:
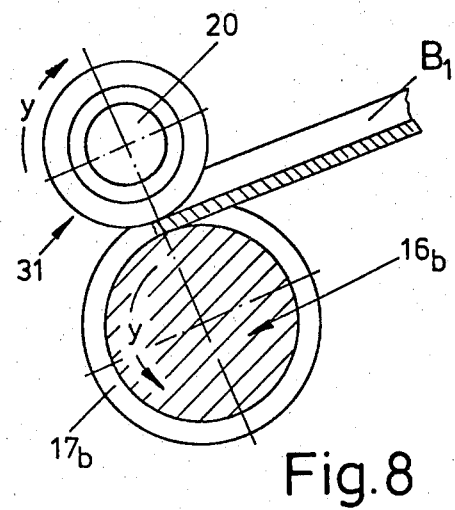
FIG. 8 The side view to FIG. 7, partly sectioned along line VIII—VIII in FIG. 7.
Figure 9:
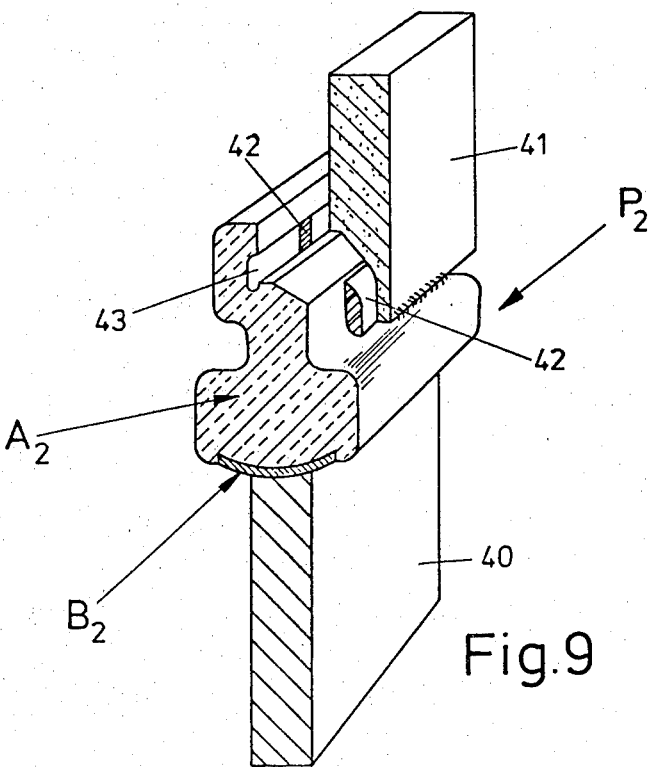
FIG. 9 A perspective view of an extruded composite section.

In a further embodiment of the invention, wheel 16 is provided with a counter wheel 31, the outer face 32 of which matches the face 17 of wheel 16 i.e. in the case of the pair of wheels shown in FIGS. 7 and 8 this concerns the curved, approximately ellipsoidal cross section of the wheel 16b running from the two outer radii q to the smaller inner radius r. The counter wheel 31 can then be situated in a recess (not shown here) such as recess 15 in FIG. 2. The flat strip B is passed through the feed channel 14 to a point about half way along this channel 14 where it is then shaped, in the manner illustrated, by the wheel 16b and its counter wheel 31 before being fed to the die opening 10 via the wheel 16.

Both wheels 16b, 31 can be turned in the direction y, either by the strips B passing through or by means of a drive mechanism which is not shown in the drawing.

The extrusion die R is, for example, particularly suitable for the economic production of so-called weld connecting sections $P_2$ which have a curved face in the form of a steel facing strip $B_2$, to which a steel frame 40 with corresponding curvature is welded. The light metal component $A_2$ of the section $P_2$ is welded to a light metal part 41 after strips 42 of insulation are inserted in groove 43 in the light metal component $A_2$.

What is claimed is:

1. A process for extruding a composite metal section through a shape-giving opening in a die, said composite comprising a beam-like section, in particular a beam-like section made of a light-weight metal, and a facing of at least a part of at least one of the surfaces of the beam-like section in the form of a strip of a different metal, which comprises producing the beam-like section by extruding a billet through a die while at the same time passing the facing strip through the shape-giving opening in the die such that the facing strip is metallically bonded to the beam-like section, wherein the facing strip is fed on a moving surface positioned adjacent to the shape-giving opening of the die and plastically deformed while in contact with said moving surface such that the facing strip does not contact the non-moving surface of the die.

2. A process according to claim 1 in which the facing strip is plastically deformed in cross section while in contact with the moving surface.

3. A process according to claim 1 in which the facing strip is plastically deformed at the die opening during extrusion.

4. A process according to claim 1 in which a plurality of facing strips are simultaneously plastically deformed and fed to the die opening for shaping the composite section.

5. A process according to claim 1 in which the composite section is thermally joined to an object of the same or similar material.

6. A process according to claim 1 further providing a counter moving surface to the moving surface and feeding the strip through the gap formed by the two moving surfaces.

7. A process according to claim 1 further providing means for powering the moving surface.

* * * * *